United States Patent
Schlittenbauer et al.

(10) Patent No.: US 11,448,291 B2
(45) Date of Patent: Sep. 20, 2022

(54) POWER-SHIFT MULTI-SPEED TRANSMISSION

(71) Applicant: Robert Bosch GmbH, Stuttgart (DE)

(72) Inventors: Tobias Schlittenbauer, Asperg (DE); Ianislav Krastev, Ludwigsburg (DE); Wael Mohamed, Hemmingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/059,564

(22) PCT Filed: May 15, 2019

(86) PCT No.: PCT/EP2019/062456
§ 371 (c)(1),
(2) Date: Nov. 30, 2020

(87) PCT Pub. No.: WO2019/228807
PCT Pub. Date: Dec. 5, 2019

(65) Prior Publication Data
US 2021/0215232 A1   Jul. 15, 2021

(30) Foreign Application Priority Data

May 30, 2018   (DE) .................. 10 2018 208 583.8

(51) Int. Cl.
*F16H 3/66*     (2006.01)
*B60K 1/00*     (2006.01)
(Continued)

(52) U.S. Cl.
CPC .............. *F16H 3/663* (2013.01); *B60K 1/00* (2013.01); *B60K 17/08* (2013.01); *F16H 37/042* (2013.01);
(Continued)

(58) Field of Classification Search
CPC .................. F16H 2200/2082–2092; F16H 2200/2038–2061; F16H 2200/2007–2200/2028
See application file for complete search history.

(56) References Cited

U.S. PATENT DOCUMENTS 3,941,013 A * 3/1976 Miller ................. F16H 3/66
 475/276
4,702,125 A * 10/1987 Kalns ................. F16H 3/66
 475/205
(Continued)

FOREIGN PATENT DOCUMENTS

CN        104875608      9/2015
DE        112011104355   9/2013
(Continued)

OTHER PUBLICATIONS

International Search Report for Application No. PCT/EP2019/062456 dated Jul. 30, 2019 (English Translation, 2 pages).

*Primary Examiner* — David R Morris
(74) *Attorney, Agent, or Firm* — Michael Best & Friedrich LLP

(57) ABSTRACT

The invention relates to a power-shift multi-speed transmission (10), comprising at least one stepped planet gear (20), which revolves around a first sun gear (18) and in a first ring gear (26). The first ring gear (26) is held on a lockable freewheel (28). A first planet gear step (22) of the stepped planet gear (20) revolves in the first ring gear (26), while a second planet gear step (24) revolves in a second ring gear (36), with which at least one brake (34) is associated.

9 Claims, 4 Drawing Sheets

(51) Int. Cl.
*B60K 17/08* (2006.01)
*F16H 37/04* (2006.01)
*F16H 63/34* (2006.01)

(52) U.S. Cl.
CPC .... *F16H 63/3416* (2013.01); *B60K 2001/001* (2013.01); *F16H 2200/0034* (2013.01); *F16H 2200/2005* (2013.01); *F16H 2200/2038* (2013.01); *F16H 2200/2064* (2013.01); *F16H 2200/2066* (2013.01); *F16H 2200/2082* (2013.01); *F16H 2200/2094* (2013.01); *F16H 2702/02* (2013.01)

(56) References Cited

U.S. PATENT DOCUMENTS 8,313,409 B2 * 11/2012 Jang .................. F16H 3/663
                                                                                                            475/281
2016/0319915 A1 * 11/2016 Ishikawa ................ F16H 3/66

FOREIGN PATENT DOCUMENTS

| DE | 102015104778 | | 9/2016 | | |
| --- | --- | --- | --- | --- | --- |
| DE | 102018208382 | A1 * | 11/2019 | ............ | B62M 11/18 |
| JP | 2002122191 | A * | 4/2002 | | |
| WO | 2014029650 | | 2/2014 | | |

* cited by examiner

POWER-SHIFT MULTI-SPEED TRANSMISSION

BACKGROUND OF THE INVENTION

The invention relates to a power-shift multi-speed transmission having at least one, in particular one, planetary transmission, which revolves around a first sun gear, and the use thereof in a vehicle.

CN 104875608 A relates to a driven axle of an electric vehicle. According to this solution, an electric machine is integrated in a coaxial arrangement into a vehicle and drives a differential. Differentials, in particular the bevel gears forming a cage, drive a first axle drive and a second axle drive, on which in turn the driven wheels of the vehicle are mounted. Although, in the case of the electric axle set known from CN 104875608 A, various transmission stages can be selected, the shifting options are limited.

SUMMARY OF THE INVENTION

According to the invention, a power-shift multi-speed transmission is proposed, having at least one stepped planet gear, which revolves around a first sun gear and in a first ring gear, wherein the first ring gear is mounted in a latchable freewheel, and a first planet gear step of the at least one stepped planet gear revolves in a first ring gear, while a second planet gear step revolves in a second ring gear, with which at least one brake is associated.

Through the provision of two brakes and of a freewheel, it is possible to perform gear shifts between various transmission ratios. Moreover, the closing of two brakes allows complete locking of the power-shift multi-speed transmission proposed according to the invention and, as a result, the formation of a parking lock function. If just one brake is used, a latching device for locking the freewheel can perform the function of the second brake. By means of the solution proposed according to the invention, a not inconsiderable weight reduction can be achieved, as can furthermore a considerable simplification of the complexity of the power-shift multi-speed transmission according to the invention as well as a considerable cost saving through the use of the freewheel.

As a development of the solution according to the invention, the first planet gear step has a tooth system with a number of teeth $z\_p1$ and the second planet gear step has a tooth system with a number of teeth $z\_p2$, where $z\_p1 > z\_p2$.

A first brake can be associated with the second ring gear in a first position, while a second brake can be associated with a second sun gear in a first position.

Alternatively, there is the possibility that the first brake is associated with a planet carrier shaft of the at least one stepped planet gear in a second position, whereas the second brake can be associated with the second ring gear in a second position.

Finally, one may also mention the possibility that the first brake can be associated with a planet carrier shaft of the at least one stepped planet gear in a second position, and the second brake can be associated with the second sun gear in a first position.

In the power-shift multi-speed transmission proposed according to the invention, a first transmission ratio $i\_1$ is defined with the first brake closed and the freewheel released, in accordance with the following relation:

$$i\_1 = 1 - ((z\_h2/z\_p2)(z\_p1/z\_s1))$$

where
$z\_h2$: number of teeth of second ring gear
$z\_p2$: number of teeth of second planet gear step
$z\_p1$: number of teeth of first planet gear step
$z\_s1$: number of teeth of first sun gear A second transmission ratio $i\_2$ can be formed, when the first brake is open, by means of a freewheel locked by means of a latching device by:

$$i\_2 = 1 - (z\_h1/z\_s1)$$

where
$z\_h1$: number of teeth of first ring gear
$z\_s1$: number of teeth of first sun gear In the case of the power-shift multi-speed transmission proposed according to the invention, it is possible, with the first brake opened, the second brake closed and the freewheel released, to form a reverse gear, which is given by the following relation:

$$i\_R = 1 - ((z\_s2/z\_p2)(z\_p1/z\_s1))$$

where
$z\_s2$: number of teeth of second sun gear
$z\_p2$: number of teeth of second planet gear step
$z\_p1$: number of teeth of first planet gear step
$z\_s1$: number of teeth of first sun gear In the case of the power-shift multi-speed transmission, a parking lock function can be implemented by locking the power-shift multi-speed transmission overall by closing at least two of three shifting elements, namely the first brake, the second brake and the freewheel with a latching device.

Finally, it should be emphasized that the power-shift multi-speed transmission implements two different transmission ratios $i\_1$ and $i\_2$ in the same direction of rotation and a reverse gear with a transmission ratio $i\_R$.

The power-shift multi-speed transmission proposed according to the invention can be shifted in such a way, by means of the latchable freewheel which is associated with the first ring gear, that it adopts a direction of rotation which is counter to the direction of rotation which is present in the case of transmission ratios $i\_1$ and $i\_2$, i.e. a reverse gear with the transmission ratio $i\_R$.

As a development of the power-shift multi-speed transmission proposed according to the invention, said transmission can be arranged in an arrangement axially parallel to the driven axle of a vehicle and, via a spur gear stage for example, can drive a differential integrated into the driven axle.

Alternatively, there is the possibility of integrating the power-shift multi-speed transmission in a coaxial arrangement into a driven axle of a vehicle, as are a stator and a rotor of the electric machine. The electric machine arranged in a coaxial arrangement, the power-shift multi-speed transmission integrated into the driven axle, forms, together with the differential, an electric axle module for vehicles with a partially electrified drivetrain.

By means of the solution proposed according to the invention, a powerful transmission, which implements two transmission ratio steps $i\_1$ and $i\_2$, a reverse gear function with the transmission ratio $i\_R$ and a parking lock function, is made available. In particular, it should be emphasized that a power shift capability of the planet gear sets is obtained and furthermore that it is possible to achieve an increase in efficiency. The use of a first and a second brake which can be mounted in different positions, and the use of a freewheel that can be locked by means of a latching device, allows different variant embodiments of the power-shift multi-speed transmission proposed according to the invention. In each variant embodiment, three transmission ratios, namely i_1, i_2 and, in the opposite direction of rotation, i_R are made available. The transmission ratios i_1 in first gear and i_2 for second gear apply to one direction of rotation, and transmission ratio i_3 applies in some shift variants in the direction of rotation opposite thereto to allow a reverse gear function.

Through the use of three transmission elements, namely the first brake, the second brake and the latching function for the freewheel, the power-shift multi-speed transmission can be transferred to a parking lock function when at least two of the listed transmission elements are closed. If just one brake is used, the freewheel can be locked by means of the latching device and can help to perform the parking lock function.

BRIEF DESCRIPTION OF THE DRAWINGS

The invention is described in greater detail below with reference to the drawing.

In the drawing.

DETAILED DESCRIPTION

Figure 1:
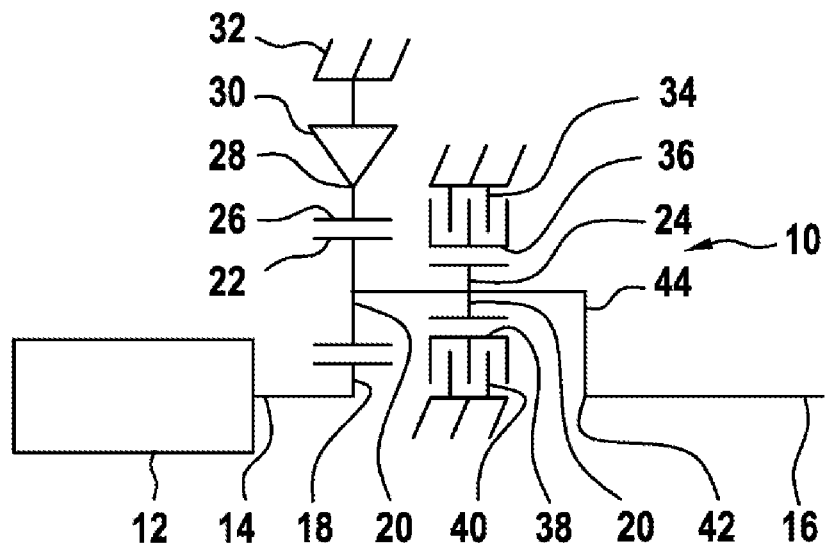
FIG. 1 shows a power-shift multi-speed transmission proposed according to the invention.

FIG. 1 shows a variant embodiment of the power-shift multi-speed transmission 10 proposed according to the invention.

An electric machine 12, arranged only schematically here in FIG. 1, drives an input shaft 14 of the power-shift multi-speed transmission 10. In addition, the power-shift multi-speed transmission 10 comprises an output shaft 16 on the output side. Mounted on the input shaft 14 is a first sun gear 18, around which a stepped planet gear 20 revolves. The stepped planet gear 20 revolves in a first ring gear 26. The stepped planet gear 20 comprises a first planet gear step 22 and a second planet gear step 24. The first ring gear 26 is mounted in a freewheel 28, which can be released or locked by means of a latching device 30. The freewheel 28 is supported on the housing 32 of the power-shift multi-speed transmission 10.

As will be apparent from the illustration in FIG. 1, the power-shift multi-speed transmission 10 comprises a first brake 34 and a second brake 40. In the variant embodiment illustrated in FIG. 1, the first brake 34 is associated with a second ring gear 36. The second brake 40 is associated with a second sun gear 38. The different installation positions of the first brake 34 and of the second brake 40 are described in greater detail below with reference to FIGS. 2, 3 and 4.

It can furthermore be seen from FIG. 1 that the stepped planet gear 20 is embodied in such a way that the number of teeth z_p1 of the first planet gear step 22 exceeds the number of teeth z_p2 of the second planet gear step 24. While the first planet gear step 22 revolves around the first sun gear 18 and in the first ring gear 26, the second planet gear step 24 of the stepped planet gear 20 revolves around the second sun gear 38 and in the second ring gear 36. The stepped planet gear 20 illustrated in FIG. 1 is mounted on a planet carrier 42, to which a planet carrier shaft 44 is connected.

Figure 2:
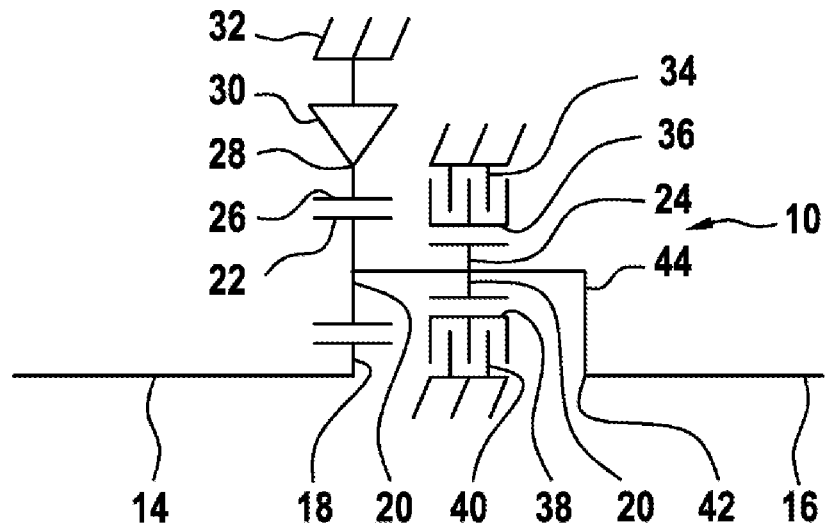
FIG. 2 shows a first variant embodiment of positions in which a first and a second brake are arranged.

From the illustration in FIG. 2, it is possible to discern a first possibility for the arrangement of the first brake 34 and of the second brake 40 in the power-shift multi-speed transmission 10.

The first brake 34 is situated in a first position 52, mounted on the housing 32. By means of the first brake 34, mounted in the first position 52, the second ring gear 36, which meshes with the second planet gear step 24, can be braked. Said gear step, in turn, meshes with the second sun gear 38. In the illustration in FIG. 2, the second sun gear 38 is associated with the second brake 40, which is in its first position 46. As in the illustration shown in FIG. 1, the power-shift multi-speed transmission 10 shown in the illustration in FIG. 2 comprises the input shaft 14 and the output shaft 16. Mounted on the input shaft 14 is the first sun gear 18, around which the stepped planet gear 20 revolves. Said planet gear furthermore meshes with the first ring gear 26, which is embodied on the housing 32 by means of a freewheel 28 having a latching device 30.

The two tooth systems of the first planet gear step 22 and of the second planet gear step 24, respectively, are embodied in such a way that the number of teeth z_p1> z_p2, whereby a transmission ratio can be specified. In first gear in the power-shift multi-speed transmission, the first brake 34 is closed and the freewheel 28 does not engage, for example. In first gear, a transmission ratio i_1 in accordance with the following relation is established:

$$i\_1 = 1 - ((z\_h2/z\_p2)(z\_p1/z\_s1))$$

where
z_h2: number of teeth of second ring gear 36
z_p2: number of teeth of second planet gear step 24
z_p1: number of teeth of first planet gear step 22
z_s1: number of teeth of first sun gear 18

If, in contrast, the first brake 34 is opened and the freewheel 28 is locked, i.e. closed, by activation of the latching device 30, a transmission ratio i_2 is established in second gear:

$$i\_2 = 1 - (z\_h1/z\_s1)$$

where
z_h1: number of teeth of first ring gear 26
z_s1: number of teeth of first sun gear 18

In the case of the power-shift multi-speed transmission according to the configuration indicated in FIG. 2, a transmission ratio i_R can be formed in a reverse gear when the first brake 34 is open, the second brake 40 is closed and the freewheel 28 does not engage. The transmission ratio in the reverse gear is as follows:

$$i\_R = 1 - ((z\_s2/z\_p2)(z\_p1/z\_s1))$$

where
z_s2: number of teeth of second sun gear 38
z_p2: number of teeth of second planet gear step 24
z_p1: number of teeth of first planet gear step 22
z_s1: number of teeth of first sun gear 18

In the power-shift multi-speed transmission 10, it is furthermore also possible to implement a parking lock function. To implement the parking lock function, two of the three transmission elements—first brake 34, second brake 40 and latching device 30 for the freewheel 28—must be closed.

Whereas, according to the variant embodiment of the power-shift multi-speed transmission 10 in FIG. 2, the first brake 34 is in the first position 52, the second brake 40 is arranged in its first position 46.

Figure 3:
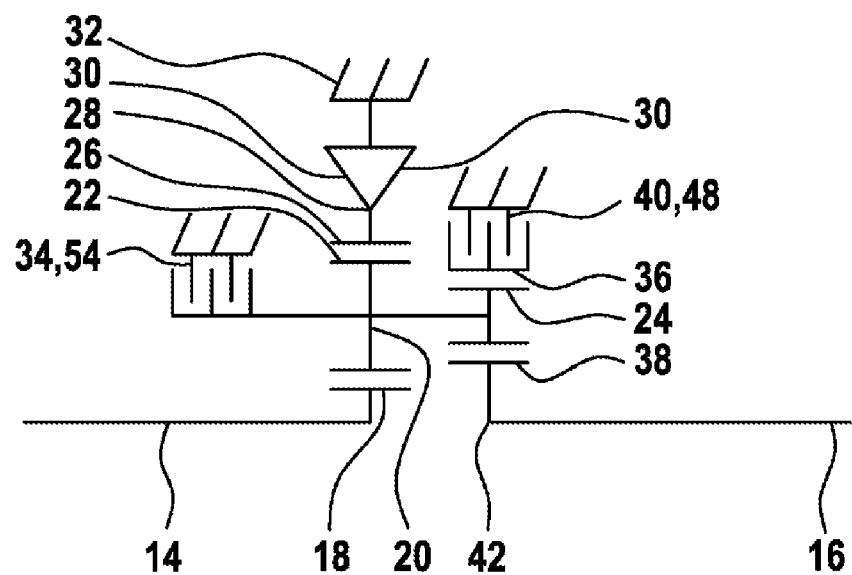
FIG. 3 shows a second variant embodiment of the positions of the arrangement of the two brakes.

In the variant embodiment shown in FIG. 3, in contrast, the first brake 34 is laterally offset in its second position 54 on an extension of the planet carrier shaft 44, on which the stepped planet gear 20 is mounted by means of its first planet gear step 22 and its second planet gear step 24. In the variant embodiment shown in FIG. 3, the second brake 40 is arranged in a second position 48. In the variant embodiment of the power-shift multi-speed transmission 10 which is illustrated in FIG. 3, a second sun gear 38 is mounted on the output shaft 16.

Figure 4:
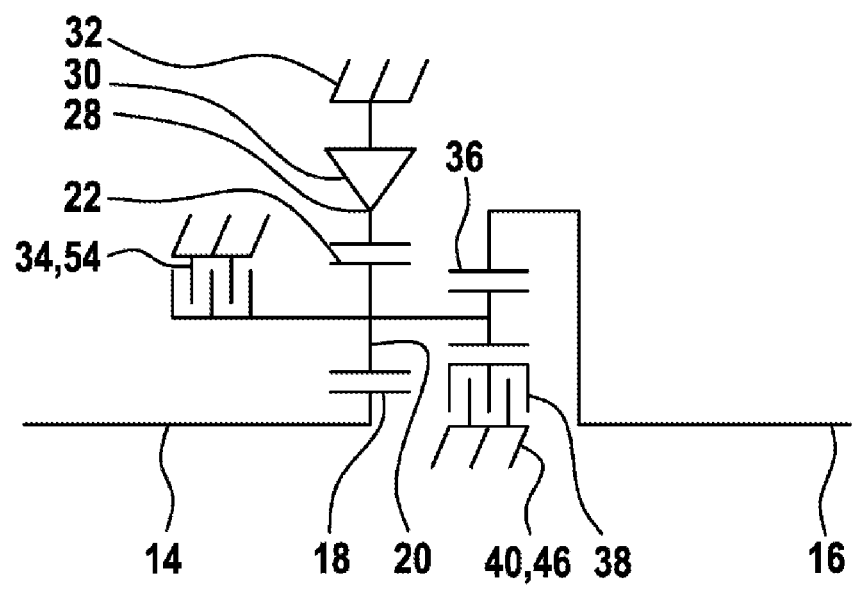
FIG. 4 shows a third variant embodiment in which the two brakes can be arranged.

In the variant embodiment shown in FIG. 4, the first brake 34 is in its second position 54, similarly to the variant shown in FIG. 3, while the second brake 40 is arranged in its first position 46. In the variant shown in FIG. 4, a second ring gear 36 is connected directly to the output shaft 16 at the output of the power-shift multi-speed transmission 10.

In the arrangement illustrated in FIG. 2, the second sun gear 38 can be omitted in the power-shift multi-speed transmission 10 for use as a two-speed transmission. On the other hand, the second brake 40, with the second sun gear 38, makes possible the formation of a reverse gear.

In the variant embodiment shown in FIG. 3, the power-shift multi-speed transmission 10 allows three different transmission ratios in the same direction of rotation.

In the variant shown in FIG. 4, it is possible, by means of the freewheel 28 on the first ring gear 26, to set a different direction of rotation than could be implemented if the first brake 34 and the second brake 40 were actuated.

Figure 5:
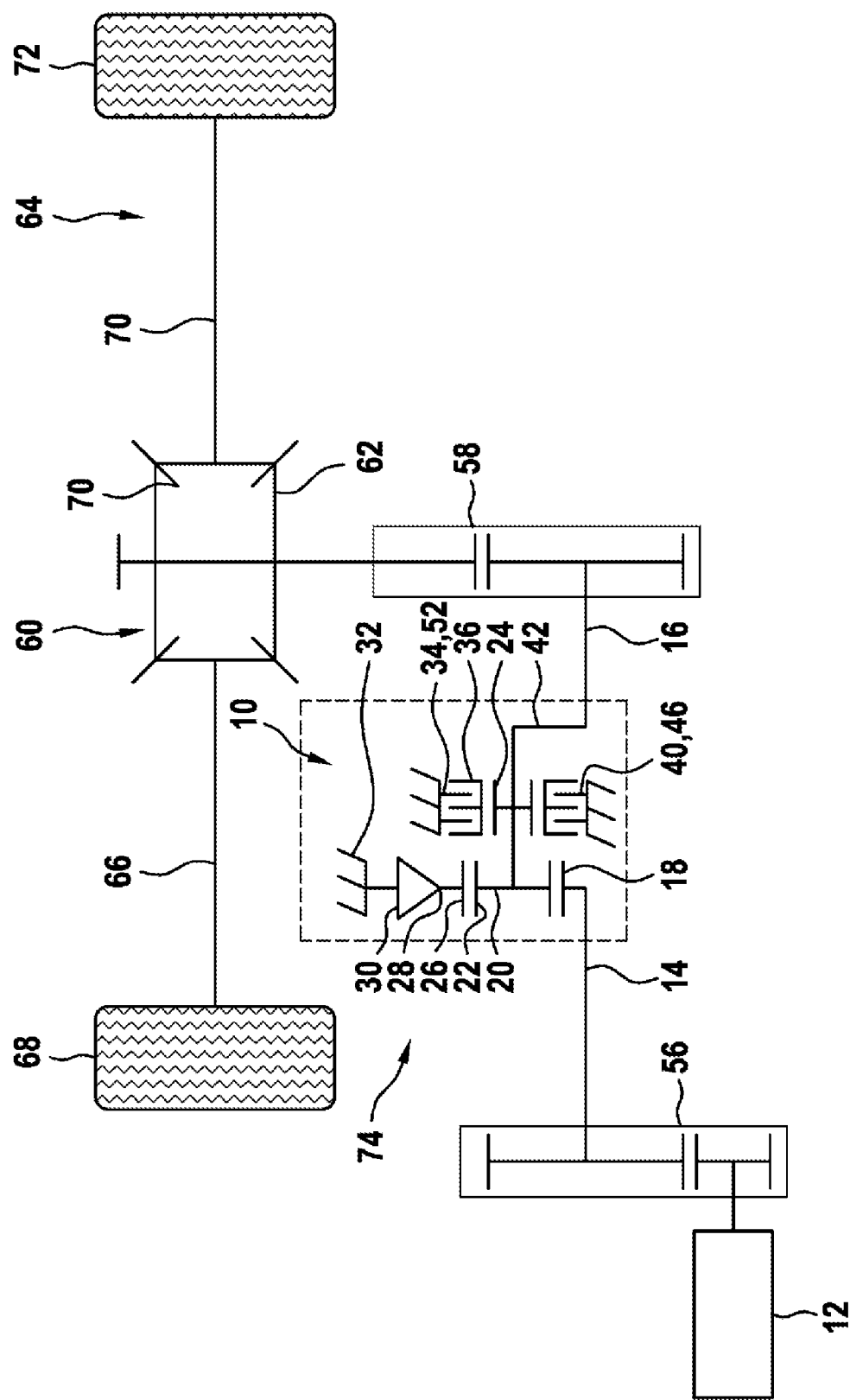
FIG. 5 shows an axially parallel arrangement of the power-shift multi-speed transmission parallel to the driven axle of a vehicle.

FIG. 5 shows the power-shift multi-speed transmission proposed according to the invention in an axially parallel arrangement 74.

As FIG. 5 shows, an electric machine 12 illustrated schematically here drives a first spur gear stage 56. Via this stage, the drive is introduced into the input shaft 14 of the power-shift multi-speed transmission 10. Mounted on the input shaft 14 is the first sun gear 18, which meshes with the first planet gear step 22 of the stepped planet gear 20. Said gear step, in turn, revolves in a first ring gear 26, which is mounted on the housing 32 of the power-shift multi-speed transmission 10 via a freewheel 28, which can be locked by means of a latching device 30.

In the illustration in FIG. 5, the first brake 34 is in its first position 52, while the second brake 40, in its first position 46, is associated with the second sun gear 38.

The stepped planet gear 20 mounted on the planet carrier 42 acts on the output shaft 16, which, in turn, drives a differential 60 via a second planet gear step 58. The differential 60 comprises a cage 62, which is formed from a number of bevel gears. On the output side of the differential 60, a first axle part 66 extends to the first wheel 68, and a second axle part 70 extends to the second wheel 72 of the vehicle.

Figure 6:
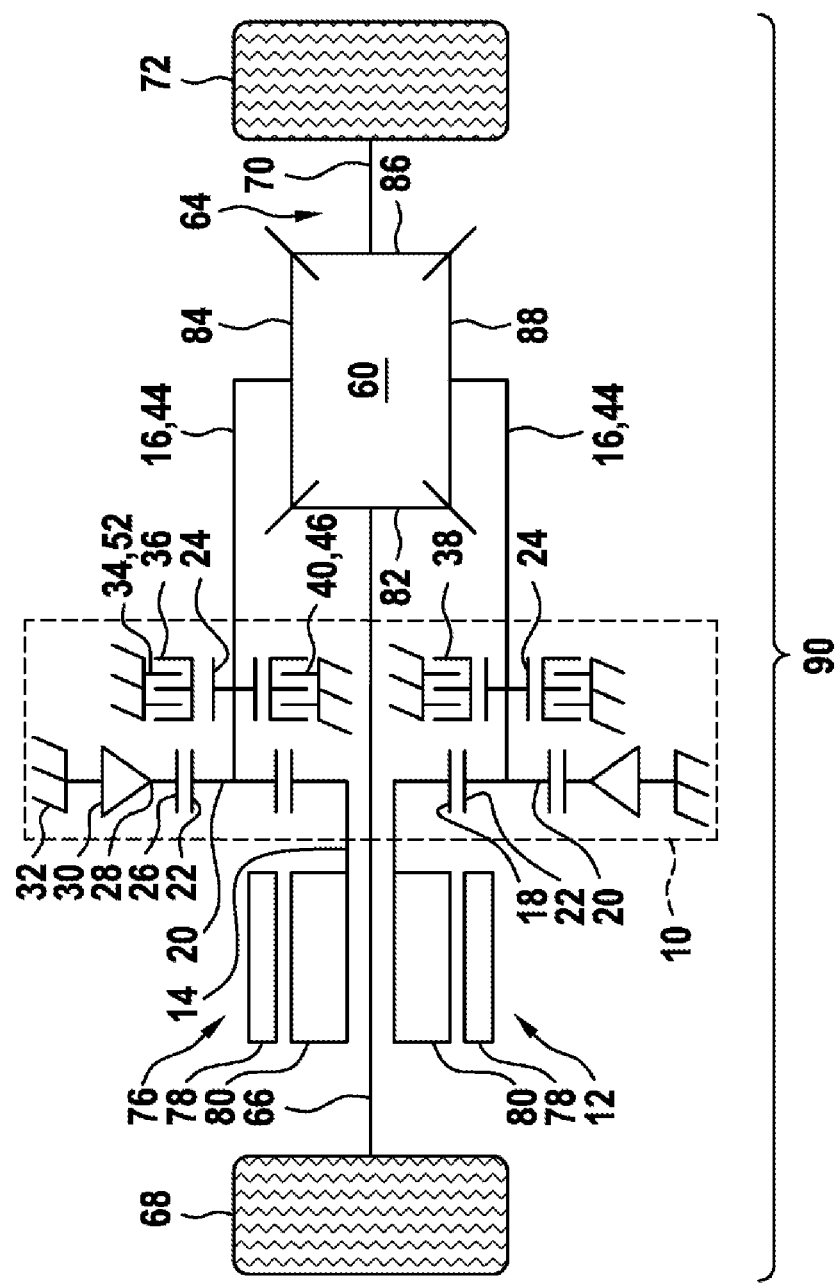
FIG. 6 shows a coaxial arrangement of the stator and rotor of an electric machine, of the power-shift multi-speed transmission and of a differential as an electric axle module.

A coaxial arrangement 76 of the power-shift multi-speed transmission 10 and the integration thereof into a driven axle 64 can be seen from the illustration in FIG. 6.

The power-shift multi-speed transmission 10 illustrated in full here is of symmetrical construction in relation to the first axle part 66 of the driven axle 64. As the illustration in FIG. 6 shows, a stator 78 of the electric machine 12 and a rotor 80 of the electric machine 12 are integrated into the driven axle 64 in the coaxial arrangement 76 of the power-shift multi-speed transmission 10. The rotor 80 drives the input shaft 14 directly. The stepped planet gears 20 illustrated in the illustration in FIG. 6 revolve around the first sun gear 18. In this case, the respective first planet gear steps 22 of the illustrated stepped planet gears 20 mesh with an internal tooth system of the first ring gear 26. This is mounted on the housing 32 by means of a freewheel 28. The freewheel 28 can be locked by means of a latching device 30.

The two second planet gear steps 24, illustrated in FIG. 6, of the stepped planet gears 20 revolve around a second sun gear 38, with which the second brake 40 is associated in its first position 46. In contrast, the first brake 34 is in its first position 52 and is associated with a smaller, second ring gear 36. On the output side, the planet carrier shafts 44, on which the stepped planet gears 20 are mounted, are connected to the output shaft 16, which drives the differential 60. The cage 62 of said differential is formed by a number of bevel gears, namely the first bevel gear 82, the second bevel gear 84, the third bevel gear 86 and the fourth bevel gear 88. Extending out from the cage 62 of the differential 60 in the direction of the two gears 68 and 72, respectively, are a first axle part 66 and a second axle part 70. The components of the electric machine 12, i.e. the stator 78 thereof and the rotor 80 thereof, together with the differential 60 and the power-shift multi-speed transmission 10, form an integrated unit, namely an electric axle module, which is denoted by the reference sign 90 and forms a compact assembly.

The invention is not restricted to the illustrative embodiments described here or to the aspects emphasized herein. On the contrary, a large number of modifications that lie within the scope of action of a person skilled in the art is possible within the range indicated by the claims.

What is claimed is:

1. A power-shift multi-speed transmission (10), having at least one stepped planet gear (20), which revolves around a first sun gear (18) and in a first ring gear (26), characterized in that the first ring gear (26) revolves in and is directly connected to a latchable freewheel (28), and a first planet gear step (22) of the at least one stepped planet gear (20) revolves in the first ring gear (26), while a second planet gear step (24) of the at least one stepped planet gear (20) revolves in a second ring gear (36) and revolves around a second sun gear (38), wherein a first brake (34) is configured to act on the second ring gear (36) and a second brake (40) is configured to act on the second sun gear (38), characterized in that, with the first brake (34) closed and the freewheel (28) released, said transmission forms a first transmission ratio i_1, which is given by:

i_1=1 ((z_h2/z_p2) (z_p1/z_s1))

where z_h2: number of teeth of second ring gear (36)
z_p2: number of teeth of second planet gear step (24)
z_p1: number of teeth of first planet gear step (22)
z_s1: number of teeth of first sun gear (18).

2. The power-shift multi-speed transmission (10) as claimed in claim 1, characterized in that z_p1 >z_p2.

3. The power-shift multi-speed transmission (10) as claimed in claim 1, characterized in that said transmission is arranged in an arrangement (74) axially parallel to a driven axle (64) of a vehicle.

4. The power-shift multi-speed transmission (10) as claimed in claim 3, characterized in that said transmission drives a differential (60) or a torque vectoring unit of the driven axle (64) of the vehicle via at least one spur gear stage (56, 58).

5. The power-shift multi-speed transmission (10) as claimed in claim 1, characterized in that said transmission is integrated in a coaxial arrangement (76) in a driven axle (64) of a vehicle, as are a stator (78) and a rotor (80) of an electric machine (12).

6. The power-shift multi-speed transmission (10) as claimed in claim 5, characterized in that the electric machine (12) arranged in the coaxial arrangement (76) and the power-shift multi-speed transmission (10) with the differential (60) integrated into the driven axle (64) form an electric axle module (90).

7. A power-shift multi-speed transmission (10), having at least one stepped planet gear (20), which revolves around a first sun gear (18) and in a first ring gear (26), characterized in that the first ring gear (26) revolves in and is directly connected to a latchable freewheel (28), and a first planet gear step (22) of the at least one stepped planet gear (20) revolves in the first ring gear (26), while a second planet gear step (24) of the at least one stepped planet gear (20) revolves in a second ring gear (36) and revolves around a second sun gear (38), wherein a first brake (34) is configured to act on the second ring gear (36) and a second brake (40) is configured to act on the second sun gear (38) characterized in that, with the first brake (34) opened and the freewheel (28) locked by a latching device (30), said transmission forms a second transmission ratio i_2, which is given by:

i_2=1 −(z_h1/z_s1)

where z_h1: number of teeth of first ring gear (26)

z_s1: number of teeth of first sun gear (18).

8. A power-shift multi-speed transmission (10), having at least one stepped planet gear (20), which revolves around a first sun gear (18) and in a first ring gear (26), characterized in that the first ring gear (26) revolves in and is directly connected to a latchable freewheel (28), and a first planet gear step (22) of the at least one stepped planet gear (20) revolves in the first ring gear (26), while a second planet gear step (24) of the at least one stepped planet gear (20) revolves in a second ring gear (36) and revolves around a second sun gear (38), wherein a first brake (34) is configured to act on the second ring gear (36) and a second brake (40) is configured to act on the second sun gear (38), characterized in that, with the first brake (34) opened, the second brake (40) closed and the freewheel (28) released, said transmission forms a reverse gear in the transmission ratio i_R, which is given by:

i_R=1 −((z_s2/z_p2) (z_p1/z_s1))

where z_s2: number of teeth of second sun gear (38)

z_p2: number of teeth of second planet gear step (24)

z_p1: number of teeth of first planet gear step (22)

z_s1: number of teeth of first sun gear (18).

9. A power-shift multi-speed transmission (10), having at least one stepped planet gear (20), which revolves around a first sun gear (18) and in a first ring gear (26), characterized in that the first ring gear (26) revolves in and is directly connected to a latchable freewheel (28), and a first planet gear step (22) of the at least one stepped planet gear (20) revolves in the first ring gear (26), while a second planet gear step (24) of the at least one stepped planet gear (20) revolves in a second ring gear (36) and revolves around a second sun gear (38), wherein a first brake (34) is configured to act on the second ring gear (36) and a second brake (40) is configured to act on the second sun gear (38), characterized in that, with the first brake (34) closed and the second brake (40) closed or with the first brake (34) closed and the freewheel (28) locked by means of a latching device (30), the power-shift multi-speed transmission (10) performs a parking lock function.

* * * * *